[19] United States Patent
Nakamura et al.

[11] Patent Number: 4,501,836
[45] Date of Patent: Feb. 26, 1985

[54] LIQUID REFRACTORY BINDER

[75] Inventors: Masayuki Nakamura; Masaaki Tsuriya; Masahiko Funabashi, all of Fujieda, Japan

[73] Assignee: Sumitomo Durez Company, Ltd., Tokyo, Japan

[21] Appl. No.: 496,324

[22] Filed: May 19, 1983

[30] Foreign Application Priority Data

May 18, 1982 [JP] Japan ................................. 57-82448

[51] Int. Cl.$^3$ .............................................. C08L 95/00
[52] U.S. Cl. ..................................... 524/66; 523/145; 523/146; 523/147
[58] Field of Search ....................... 523/145, 146, 147; 524/66

[56] References Cited

U.S. PATENT DOCUMENTS

| | | | |
|---|---|---|---|
| 3,607,809 | 9/1971 | Elby ...................................... | 524/66 |
| 3,899,455 | 8/1975 | Unterstenhoefer et al. .......... | 524/66 |
| 4,036,798 | 7/1977 | Hoppe et al. ......................... | 524/66 |
| 4,252,700 | 2/1981 | Funabiki et al. ..................... | 523/147 |
| 4,290,928 | 9/1981 | Funabiki et al. ..................... | 523/145 |
| 4,345,003 | 8/1982 | Matsushima et al. ................ | 523/145 |

Primary Examiner—Melvyn I. Marquis
Attorney, Agent, or Firm—James F. Tao; James F. Mudd

[57] ABSTRACT

A polymeric binder composition for refractory aggregates is disclosed. The binder is a resole type phenolic resin, solvent and a tar, pitch or mixtures thereof. The solvent has a boiling point of greater than 75° C. and is added to the resole type phenolic resin to impart a viscosity range of between 1 to 1000 poise. The tar/pitch component is combined in the solvent-resin mixture, and is incorporated within the ratios of 30:70 to 70:30 with relation to the phenolic resin. The binder results in a high carbon binder.

18 Claims, No Drawings

LIQUID REFRACTORY BINDER

BACKGROUND OF THE INVENTION

This invention relates to a liquid refractory binder comprising a tar/pitch and a liquid resin mainly consisting of a resole type phenolic resin compatible with the tar/pitch.

Conventional tar is employed widely for refractory binders but is generally low in the fixed carbon content and rich in volatile substances upon firing. Therefore, it is not suitable as a binder in obtaining refractories with a high density and high strength. Recently, thermosetting phenolic resin binders have been widely employed because they have an advantage in enabling refractories to have a high density and high strength due to their high fixed carbon content even in a low temperature stage of the firing process. However the thermosetting phenolic resin binders have drawbacks. They are costly when compared with tar and pitch. They are poor in oxidization resistance at elevated temperatures.

It is an object of this invention to prepare a liquid refractory resin binder containing a phenolic resin of the resole type which incorporates a tar, pitch or mixtures thereof which will overcome the above drawbacks.

An additional object of the invention is to prepare a high carbon content binder upon use.

SUMMARY OF THE INVENTION

This invention is concerned with a polymeric binder composition for refractory aggregates wherein the binder is composed of a liquid resole phenolic resin and a solvent, admixed with a tar, pitch or mixtures thereof. The solvent employed should have a boiling point of greater than 75° C., and the viscosity of the solvent-resole resin mixture should fall into the range of 1 to 1000 poise. The resole phenolic resin should be prepared using a catalyst system composed of ammonia, amines or a mixture of alkali metal oxides, hydroxides, carbonates in combination with ammonia or amines may be used. The solvent to phenolic resin proportion should be selected from the range of less than 100 parts solvent for each 100 parts resole phenolic resin. The ratio of tar, pitch and mixtures to resole phenolic resin thereof will be selected from the range of 70:30 to 30:70.

The solvent is incorporated into the binder of the invention to make the resole phenolic resin and the tar, pitch or mixtures thereof compatible. Upon gelation, a uniform homogeneous mass is formed between the resin and the tar/pitch.

The fixed carbon content resulting from the binder of the invention is greater than the level of fixed carbon content obtained from either the resin or tar/pitch used individually.

DETAILED DESCRIPTION OF THE INVENTION

This invention refers to a binder for refractory aggregates that provides a high carbon content.

After much investigation to overcome said drawbacks in both phenolic resins and tar/pitch, the inventors hereof have found a novel liquid refractory binder by means of incorporating tar/pitch into a liquid resin mainly consisting of a resole type phenolic resin prepared in the presence of a catalyst selected from ammonia and amines.

A liquid resin according to the present invention is extremely excellent in compatibility with tar/pitch. This results in enabling a phenolic resin to incorporate a high content of tar/pitch thereinto, and to cause a sufficient effect in the oxidation resistance of the refractories therefrom under an elevated temperature.

Refractories are obtained using to the liquid refractory binder with an excellent dry strength, a high fixed carbon content, and an inexpensive price due to an excellent compatibility of said liquid resin mainly consisting of a resole type phenolic resin with tar/pitch.

A liquid phenolic resin binder according to the present invention is prepared by a reaction in the presence of a catalyst such as ammonia and amines such as triethanolamine, triethylamine, etc., however, the reaction may be carried on in the presence of any of oxides, hydroxides and carbonates of alkali metals such as sodium, potassium, lithium, etc. Alternatively, any of oxides and hydroxides of alkaline earth metals such as calcium, magnesium, barium, etc. can be employed.

Among said catalysts, ammonia, triethylamine, a combination of sodium hydroxide with ammonia, and that of sodium hydroxide with triethylamine are preferably employed.

Tar/pitch represented and employed herein is tar, pitch and a mixture thereof. The form thereof is either solid or liquid. Typical embodiments are tar such as petroleum tar, coal tar, road tar, wash oil, anthrathene oil, creosote oil, etc., pitch such as petroleum pitch, pitch or soft pitch of carbonization, etc., and cut-back tar prepared by cutting one or more kinds of pitch back with one or more kinds of tar.

The incorporating proportion range of said liquid resin of the liquid refractory binder according to the present invention against tar/pitch is 90 against 10 by weight to 10 against 90 by weight, preferably 70 against 30 to 30 against 70 by weight.

The incorporating method for said liquid resin and tar/pitch is optional; either premixing both of them, or mixing separately each of them during the production of refractories.

A liquid resin of the liquid refractory binder according to the present invention has its viscosity range of 1 to 1000 poise at 25° C., preferably adjusted to 5 to 500 poise at 25° C. The range defined here is determined by a Brookfield type viscometer.

Solvent incorporating proportion range to 100 parts by weight of the effective ingredient of a resole type phenolic resin composing said liquid resin of the liquid refractory binder according to the present invention is 100 parts by weight or less, preferably 60 parts by weight or less. Said effective ingredient hereof is the reaction product of phenols and aldehydes in the presence of a catalyst.

Solvent incorporated in said liquid resin of the liquid refractory binder according to the present invention is a liquid substance having its boiling point of 75° C. or more, preferably 100° C. or more typified as ethylene glycol, diethylene glycol, glycerine, ketones, esters, ketone-esters, ethers, ketone-ethers, ester-ethers, etc.

The solvent is incorporated in the binder of the invention to make the resole phenolic resin and the tar/pitch compatible. That is, the solvent should dissolve both the resin and the tar/pitch. At gelation, the phenolic resin and the tar/pitch form a uniform homogeneous mass.

When the viscosity range of the liquid refractory binder according to the present invention is more than 1000 poise, the binder fails in enabling refractory aggregates to wet sufficiently and to be dispersed homogeneously due to its viscosity. When it is less than 1 poise, decrease in non-volatile content of the binder impairs the strength of refractories obtained therefrom.

When said solvent incorporating proportion range is more than 100 parts by weight, the fixed carbon content of the binder becomes less, resulting in failure of the strength of refractories obtained therefrom.

When the boiling point range of said solvent is less than 75° C. under atmospheric pressure, mixing states of plastic mud employing said solvent become unstable because of an rapid volatility thereof at ambient temperature.

The liquid refractory binder according to the present invention is applied for manufacturing both fired or non-fired refractories, alternatively monolithic refractories such as ramming refractories, blast refractories, gunning refractories, castable refractories, mortar refractories, etc.

Said effective ingredient of a resole type phenolic resin of the liquid refractory binder according to the present invention comprises reacting non-limitative molar proportion range of phenols and aldehyde, however it is preferably 0.8 to 1.5 moles of aldehydes against 1 mole of phenols. Any form of resin may be employed in the present invention either solid or liquid. Phenols for preparing said effective ingredient of a resole type phenolic resin are phenol, cresol, xylenol, ethylphenol, propylphenol, propenylphenol, butylphenol, octylphenol, nonylphenol, phenylphenol, cathecol, resorcin, hydroquinone, bisphenol A, etc. wherein any by-product present therein during preparing said phenols is included as an embodiment. The effectiveness of the present invention may be improved in the presence of said by-product. Aldehydes for preparing the same are formaldehyde, para-formaldehyde, trioxane, polyoxymethylene, acetaldehyde, etc., however any aldehyde doner can arbitrarily be employed in the present invention.

The inventors hereof will further explain the present invention with the following non-limitative Examples and Comparative Examples, wherein "parts" and "percent" represent "parts by weight" and "percent by weight", respectively.

EXAMPLE 1

To a reaction kettle equipped with a stirrer, a reflux cooler, and a thermometer, 360 parts of phenol, 311 parts of formalin and 15 parts of 28% aqueous ammonia were charged. The temperature of the mixture was gradually elevated, and upon reaching 100° C., it was held for 50 minutes reflux, and dehydrated under 60 to 80 mmHg. When the stock temperature became 80° C., it was heated for 30 minutes. Thus 480 parts of the effective ingredient of a resole type phenolic resin was obtained. After it was switched to atmospheric pressure, 120 parts of ethylene glycol was added thereinto and well mixed so that the solvent-incorporating proportion of a liquid resin was 25 parts to 100 parts of said effective ingredient of the obtained resole type phenolic resin. A liquid resin having its viscosity at 25° C. of 149 poise and its pH value of 7.7 was obtained.

To said liquid resin, a kind of coal tar was added in several proportions as indicated in Table 2. Each liquid binder thus prepared was put into a test tube and heated at 200° C. The gel forming behavior thereof was observed and recorded in Table 1. Separately, the fixed carbon content was determined for each liquid binder, and recorded in Table 2.

EXAMPLE 2

To a reaction kettle equipped with a stirrer, a reflux cooler, and a thermometer, 360 parts of phenol, 404 parts of 37% formalin, 1.8 parts of triethylamine, and 3.6 parts of 50% sodium hydroxide solution were charged. The temperature of the mixture was gradually elevated, and 500 parts of the effective ingredient of a resole type phenolic resin was obtained according to the procedure of Example 1. After it was switched to atmospheric pressure, 200 parts of diethylene glycol was added thereto and mixed so that the solvent-incorporating proportion of a liquid resin was 40 parts to 100 parts of said effective ingredient of the obtained resole type phenolic resin. A liquid resin having its viscosity at 25° C. of 180 poise and its pH value of 7.7 was obtained.

Each liquid binder was mixed with a kind of coal tar prepared in the same procedure as Example 1. The gel forming behavior and its fixed carbon content were determined and results shown in Tables 1 and 2.

EXAMPLE 3

To the liquid resin obtained according to Example 2, a kind of cutback tar, comprised by cutting coal pitch back with creosote oil in the same weight proportion, was added in several proportions as indicated in Table 2. Each liquid binder thus obtained was observed for the gel forming behavior and the fixed carbon content in the same procedure of Example 1, and results are shown in Tables 1 and 2.

COMPARATIVE EXAMPLE 1

To a reaction kettle equipped with a stirrer, a reflux cooler, and a thermometer, 360 parts of phenol, 279 parts of 37% formalin, and 7.2 parts of 50% solution of sodium hydroxide were charged. The mixture was reacted at 85° C. for 90 minutes, and was dehydrated under 60 to 80 mmHg. After it was heated at 95° C. for 30 minutes, 480 parts of the effective ingredient of a resole type phenolic resin was obtained. Conditions were switched to atmospheric pressure, and 120 parts of ethylene glycol was added thereto so that the solvent-incorporating proportion of a liquid resin was 25 parts to 100 parts of said effective ingredient of the obtained resole type phenolic resin. A liquid resin having its viscosity of 23 poise and its pH value of 8.6 was obtained.

After this the same procedure of Example 1 was taken for observing the gel forming behavior and determining the fixed carbon content, the results are shown in Tables 1 and 2.

COMPARATIVE EXAMPLE 2

To a reaction kettle with a stirrer, a reflux cooler, and a thermometer, 1000 parts of phenol, 650 parts of 37% formalin, and 8 parts of oxalic acid were charged. The temperature of the mixture was gradually elevated, and when it reached 100° C., after 90 minutes' reflux, it was dehydrated under 40 to 60 mmHg. When the stock temperature reaches 150° C., it was switched to atmospheric pressure, and 700 parts of ethylene glycol were added thereinto. Thus, 1750 parts of a liquid novolac type phenolic resin having its viscosity at 25° C. of 65 poise and its pH value of 4.1 was obtained.

To the liquid resin, a kind of coal tar was added in several proportions as indicated in Table 2, and further 9 parts of hexamethylene tetramine to 100 parts of the liquid resin was added to each of them. After this the same procedure of Example 1 was taken for observing the gel forming behavior and determining the fixed carbon content. Results are shown in Tables 1 and 2.

Table 1 indicates the results of observing the gel forming behavior of each liquid binder obtained according to Example 1, 2 and 3, and Comparative Example 1 and 2, respectively.

TABLE 1

| Proportion | Example | | | Comparative Example | |
|---|---|---|---|---|---|
| Liquid resin:Tar/pitch | 1 | 2 | 3 | 1 | 2 |
| 90:10 | | | | | |
| 50:50 | | | | X | X |
| 30:70 | | | | X | X |

∘: Homogeneous gel formed.
X: Separated into two phases.

As is shown in Table 1, the compatibility of each liquid resin obtained according to Example 1, 2 and 3 is superior to that according to Comparative Example 1 and 2.

Table 2 indicates both the actual and the logical fixed carbon content, and the divided value of the former by the latter. The theoretical carbon content hereof is calculated by the proportional division of the total fixed carbon content in each liquid resin and tar/pitch.

TABLE 2

| Proportion | Example | | | Comparative Example | |
|---|---|---|---|---|---|
| Liquid resin:Tar/pitch | 1 | 2 | 3 | 1 | 2 |
| 100:0 | 37.6 | 32.5 | 32.5 | 43.0 | 36.1 |
|  | 37.6 | 32.5 | 32.5 | 43.0 | 36.1 |
|  | (1.00) | (1.00) | (1.00) | (1.00) | (1.00) |
| 90:10 | 37.2 | 33.4 | 33.4 | 39.7 | 32.2 |
|  | 36.1 | 31.5 | 32.1 | 41.0 | 33.0 |
|  | (1.03) | (1.06) | (1.04) | (0.97) | (0.98) |
| 50:50 | 37.0 | 33.1 | 34.0 | 33.0 | 28.6 |
|  | 30.1 | 27.6 | 30.6 | 32.8 | 29.4 |
|  | (1.23) | (1.13) | (1.11) | (1.01) | (0.97) |
| 30:70 | 33.4 | 28.3 | 32.8 | 26.0 | 26.8 |
|  | 27.1 | 25.6 | 29.9 | 28.7 | 26.6 |
|  | (1.23) | (1.11) | (1.10) | (0.91) | (1.01) |
| 10:90 | 25.2 | 24.7 | 29.8 | 22.5 | 23.0 |
|  | 24.1 | 23.6 | 29.2 | 24.6 | 24.0 |
|  | (1.05) | (1.04) | (1.02) | (0.91) | (0.96) |
| 0:100 | 22.6 | 22.6 | 28.8 | 22.6 | 22.6 |
|  | 22.6 | 22.6 | 28.8 | 22.6 | 22.6 |
|  | (1.00) | (1.00) | (1.00) | (1.00) | (1.00) |

Upper: The actual fixed carbon content
Middle: The theoretical fixed carbon content
(Lower): Divided index (Actual/Theoretical)
Test method: According to JIS K-2425

As it is shown in Table 2, in the incorporating proportion range of each liquid resin and tar/pitch according to the present invention, the actual fixed carbon content according to Example 1, 2 and 3 is clearly larger than the theoretical one, respectively, which characterizes an inventive position of the liquid binder according to the present invention.

As disclosed herein, the solvent can be incorporated in the compositions of the invention in a proportion up to 100 parts by weight per hundred parts by weight of resole phenolic resin. The lower limit of the solvent proportion is about 10 parts per 100 parts by weight of resole phenolic resin.

We claim:

1. A liquid binder for refractory aggregates comprising tar, pitch or mixture thereof, and a liquid resin component comprising a solvent having a boiling point of at least 75° C. and a resole phenolic resin prepared using a catalyst system of ammonia, amines or mixtures thereof, wherein the range of solvent to 100 parts by weight of effective resole phenolic resin is less than 100 parts by weight, and the solvent is selected from the group consisting of glycols, ketones, esters and ethers.

2. A liquid binder according to claim 1, wherein the ratio, by weight, of the liquid resin to the tar component is from 90:10 to 10:90.

3. A liquid binder according to claim 2, wherein the weight ratio is from 70:30 to 30:70.

4. A liquid binder according to claim 1, wherein the viscosity of the liquid resin has a range from 1 to 1000 poise.

5. A liquid binder according to claim 4, wherein the viscosity range is from 5 to 500 poise.

6. A liquid binder according to claim 1, wherein the solvent has a boiling point of at least 100° C.

7. A liquid resin according to claim 1, wherein the proportion range of solvent to 100 parts of effective resole phenolic resin is less than 60 parts.

8. A liquid binder according to claim 2, wherein the solvent has a boiling point of at least 100° C.

9. A liquid binder according to claim 4, wherein the solvent has a boiling point of at least 100° C.

10. A liquid binder according to claim 1, wherein the catalyst system additionally contains an alkaline metal oxide, alkaline metal hydroxide or alkali metal carbonate.

11. A liquid binder according to claim 2, wherein the catalyst system additionally contains an alkali metal oxide, alkaline metal hydroxide or alkaline metal carbonate.

12. A liquid resin according to claim 4, wherein the catalyst system additionally contains an alkaline metal oxide, alkaline metal hydroxide or alkaline metal carbonate.

13. A liquid binder according to claim 1, wherein the solvent is ethylene glycol.

14. A liquid binder for refractory aggregates comprising tar, pitch or mixtures thereof, a liquid resin composition comprising a solvent having a boiling point of at least 100° C., and a resole phenolic resin prepared using a catalyst system of an alkali metal oxide, alkali metal hydroxide, alkali metal carbonate, alkaline earth metal oxide or alkaline earth metal hydroxide, wherein the proportion range of solvent to 100 parts of resole phenolic resin is less than 60 parts, said liquid resin composition having a viscosity range of from 5 to 500 poise, and the proportion range of tar, pitch or mixtures thereof, to liquid resin is 30:70 to 70:30, and the solvent is selected from the group consisting of glycols, ketones, esters and ethers.

15. A liquid binder for refractory aggregates comprising tar, pitch or mixtures thereof, a liquid resin composition comprising a solvent having a boiling point of at least 100° C., and a resole phenolic resin prepared using a catalyst system of ammonia, amines or mixtures thereof, wherein the proportion range of solvent to 100 parts or resole phenolic resin is less than 60 parts, said liquid resin composition having a viscosity range of from 5 to 500 poise, and the proportion range of tar, pitch or mixtures thereof, to liquid resin is 30:70 to 70:30, and the solvent is selected from the group consisting of glycols, ketones, esters and ethers.

16. A liquid binder according to claim 1, wherein the solvent is selected from ketone-esters, ketone-ethers or ester-ethers.

17. A liquid binder according to claim 14 wherein the solvent is selected from ketone-esters, ketone-ethers or ester-ethers.

18. A liquid binder according to claim 15 wherein the solvent is selected from ketone-esters, ketone-ethers or ester-ethers.

* * * * *